(12) United States Patent
O'Connell et al.

(10) Patent No.: US 10,212,577 B2
(45) Date of Patent: Feb. 19, 2019

(54) ROAMING ON LOW POWER WIDE AREA NETWORKS

(71) Applicant: Hewlett Packard Enterprise Development LP, Houston, TX (US)

(72) Inventors: John O'Connell, Uriage-les-Bains (FR); Prasad Vithal Shetty, Bangalore (IN); Khondoker Ehteshamul Huq, Raleigh, NC (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 67 days.

(21) Appl. No.: 15/342,319

(22) Filed: Nov. 3, 2016

(65) Prior Publication Data
US 2018/0124590 A1    May 3, 2018

(51) Int. Cl.
*H04W 8/02* (2009.01)
*H04W 8/12* (2009.01)
*H04W 8/22* (2009.01)
*H04W 84/04* (2009.01)
*H04W 88/16* (2009.01)

(52) U.S. Cl.
CPC .............. *H04W 8/02* (2013.01); *H04W 8/12* (2013.01); *H04W 8/22* (2013.01); *H04W 84/04* (2013.01); *H04W 88/16* (2013.01); *Y02D 70/00* (2018.01); *Y02D 70/142* (2018.01); *Y02D 70/26* (2018.01)

(58) Field of Classification Search
CPC ......... H04W 8/02; H04W 8/22; H04W 88/16; H04W 8/12; H04W 84/04
USPC ............ 455/432.1–433, 435.1–445; 370/331
See application file for complete search history.

(56) References Cited

U.S. PATENT DOCUMENTS

| 6,665,718 B1 * | 12/2003 | Chuah ................. H04L 12/4633 709/225 |
| 8,893,007 B2 | 11/2014 | Vadde et al. |
| 9,060,263 B1 | 6/2015 | Carames et al. |
| 9,137,727 B2 | 9/2015 | Kulkarni |
| 9,414,305 B2 | 8/2016 | Pankajakshan et al. |
| 2005/0165696 A1 * | 7/2005 | Jakobsson .............. G06Q 20/06 705/65 |
| 2006/0291465 A1 * | 12/2006 | Cantenot ............... H04L 12/185 370/390 |

(Continued)

FOREIGN PATENT DOCUMENTS

CN    106793005 A    5/2017

OTHER PUBLICATIONS

Kendal, D., "The LoRaWAN Specification Developments", LoRa Alliance Wide Area Networks for IoT, Technical Committee, LoRa Alliance 5th All Members Meeting, Jul. 19-20, 2016, 25 pages.

(Continued)

*Primary Examiner* — Michael Y Mapa
(74) *Attorney, Agent, or Firm* — Hewlett Packard Enterprise Patent Department (57) ABSTRACT

According to one example of the disclosure, a first LPWAN receives a message from an Internet of Things (IoT) device. The message includes at least one of: a network ID associated with a second LPWAN and an application ID associated with the second LPWAN. In response to a determination that at least one of the network ID and the application ID are on the roaming white list of the first LPWAN, the message is caused to become available to the second LPWAN.

20 Claims, 9 Drawing Sheets

(56) References Cited

U.S. PATENT DOCUMENTS

| | | | | |
|---|---|---|---|---|
| 2009/0291684 A1* | 11/2009 | Sullivan | ............... | H04L 63/10 455/435.1 |
| 2010/0128685 A1* | 5/2010 | Jiang | ............... | H04W 8/12 370/329 |
| 2012/0034916 A1* | 2/2012 | Hu | ............... | H04W 28/24 455/432.1 |
| 2012/0311051 A1* | 12/2012 | Banks | ............... | H04W 4/14 709/206 |
| 2013/0279401 A1* | 10/2013 | Sander | ............... | H04W 48/18 370/328 |
| 2015/0195701 A1* | 7/2015 | Tuilier | ............... | H04W 60/06 455/433 |
| 2017/0244629 A1* | 8/2017 | Kodaypak | ............... | H04W 4/70 |

OTHER PUBLICATIONS

Li, X. et al., "A Lightweight Roaming Authentication Protocol for Anonymous Wireless Communication", (Research paper), 2012, 6 pages.

Patriarca, F. et al., "UPMT Per-Application Mobility Management Solution: A Demo for Linux and Android Terminals", (Research Paper), Oct. 21-22, 2012, 4 pages.

Raza, U. et al., "Low Power Wide Area Networks: a Survey", (Research Paper), Jun. 23, 2016, 15 pages.

Roth, M. et al., "Flexible and Modular Low Power Wireless Networks", The 6th International Conference on Ambient Systems, Networks and Technologies, Procedia Computer Science 52 (2015) 695-699.

Unknown, "Netwise—Harness the Power of Policy on Device", Smith Micro Software, Aliso Viejo, CA, Mar. 7, 2014, 6 pages.

"Low Throughput Networks (LTN); Protocols and Interfaces," Jul. 1, 2014, pp. 1-33, ETSI.

Colin Anderson, "Interfacing with LoRaWAN, Introduction," Oct. 10, 2016, pp. 1-9, v1.1.

Johan Stokking, "RFC: Network Architecture," Oct. 2015, pp. 1-26, The Things Network.

N. Somin et al.; "LoRaWAN(TM) Specification," Jan. 2015, pp. 1-82, Version: V1.0, LoRa Alliance, Inc.

Partial European Search Report, EP Application No. 17199744.8, dated Feb. 6, 2018, pp. 1-27, EPO.

S. Farrell, "LPWAN Overview," Internet-Draft, Oct. 31, 2016, pp. 1-35, Trinity College, Dublin, Ireland.

* cited by examiner

ROAMING ON LOW POWER WIDE AREA NETWORKS

BACKGROUND

Low Power Wide Area Networks (LPWANs) are a new type of wireless telecommunication network that allows long range communications at a lower bit rate among connected objects. In this regard, LPWANs have a much greater range than wireless local area networks (WLANs), but use less power than conventional mobile telecommunication networks. LPWANs aim to provide affordable connectivity to low power devices distributed over large geographical areas. Compared to a conventional mobile telecommunication network, a LPWAN may have lower bandwidth and may employ simpler transmission schemes requiring less processing power. As such LPWANs are well suited to the Internet of Things (IoT) where the end devices may be simple devices with low processing power, that connect occasionally to the network to upload or download small amounts of data.

Example LPWAN technologies include, but are not limited to, LoRaWAN and SIGFOX. It is envisaged that LPWANs will be rolled out primarily on a national level such that a LPWAN covers a whole country, although in some cases a LPWAN may extend over a smaller geographical area such as a state, province, region or city. In still other cases a LPWAN may span several countries. There may be several competing LPWANs within the same geographical area. A LPWAN may include a number of gateways that route traffic to and from a number of network servers.

BRIEF DESCRIPTION OF THE DRAWINGS

Examples will now be described, by way of non-limiting example, with reference to the accompanying drawings, in which.

DETAILED DESCRIPTION

In the following description the terms "a" and "an" are used to denote the presence of one or more of a particular element. The phrase "a number of" is used to denote one or more of a particular item. The terms "includes", "including" and "comprising" are used to mean "including at least". The phrases "A connects to B" and "A is connected to B" include both a direct connection between A and B and an indirect connection via one or more intermediate devices.

The Internet of Things (IoT) refers to the connection of a multitude of different types of devices to a network in order to send and receive data or instructions. It is envisaged that the IoT will facilitate connection to the Internet of many devices which today are not currently connected to the Internet, such as house hold appliances, home automation systems, lights, fire alarms, motion-sensor video cameras, thermostats, sensors, products tags, medical devices, etc. Of particular interest is sending sensor data and receiving actuation instructions. In the context of this disclosure an IoT device is any device that is able to connect to a Low Power Wide Area Network (LPWAN) to send or receive data. The IoT device may include a sensor and may transmit information from the sensor over the LPWAN. The sensor may for example be a global positioning sensor, other type of location sensor, a temperature measuring device, a weighing device, or any sensor for monitoring an environment of the IoT device or monitoring a state of a product which the IoT device is associated with. The sensor data may for example include data relating to a location of the IoT device, a temperature of the IoT device, weight data, data relating to a sensed environment of the IoT device, or data relating to a product monitored by a sensor of the IoT device.

Some IoT devices may be relatively simple devices with low processing power and may send or receive relatively small amounts of data. Thus many types of IoT devices may not need a high throughput, high bandwidth network. Furthermore, it may be desirable for an IoT device to have a longer battery life, especially in the case of remote sensors. These factors make LPWANs well suited to supporting the Internet of Things (IoT), as compared to a conventional mobile telecommunication network, such as 3G or 4G. Transmission and reception in a LPWAN may employ relatively low power and a relatively low degree of processing power. This makes it possible to keep the cost of LPWAN end devices low and helps to extend battery life. Compared to wireless local area networks (WLANs), a LPWAN has a much greater range and may also consume less power. For example, a gateway or a base station of an LPWAN may have a range of a few hundred meters to several hundred kilometers depending on the environment and the technology employed. Compared to conventional mobile telecommunication networks, a LPWAN may use simpler transmission schemes and use less power for transmission and/or reception of messages.

Many applications of IoT and LPWANs may employ mobile IoT devices which are not fixed to a specific location. One such example is tracking devices. For instance, pet collars with a transmitter to locate the pet, bicycle tags for a similar purpose, package tags for tracking physical mail and courier items, tags for tracking hardware belonging to an enterprise and/or shipping containers, etc. Other applications include for instance, personal health devices or wearable electronic devices, such as pedometers, blood pressure or heart rate monitors, etc. Still another example are sensors for tracking location or monitoring the environment of wildlife or farm animals, etc.

Each IoT device on a LPWAN may be associated with an application for providing a particular service. For example, a pet tracking collar may be associated with a pet tracking application, a bike tracking device with a bike tracking service, a tracking container shipments device with a container tracking application etc. Each application may be hosted on an application server. The application server may, for example, be a physical server, virtual machine or a cloud service. Meanwhile, the LPWAN may be provided by the company providing the application service or by a third party, such as a telecommunication company. The IoT devices themselves, e.g. pet collar, may for example be supplied by the company providing the application service. An IoT device may wirelessly transmit a message over the LPWAN to a nearby gateway of the LPWAN. The message may comprise a payload including data and a header including an application ID and a device ID. The gateway may then forward the message to a network server of the LPWAN and the network server may forward the message to the appropriate application server based on the application ID.

In the above scenario it is envisaged that each IoT device belongs to a home network. This is analogous, for example, to a mobile phone belonging to a particular cellular network provider. It is further envisaged that IoT applications may be associated with a particular home network. For instance, a French company providing a pet tracking service may arrange a service agreement with a French LPWAN so that messages from pet collars of the tracking service are forwarded by the French LPWAN to an application server of the pet tracking company. The French LPWAN may for example program their network servers to forward messages with an application ID of the pet tracking service to an application server of the pet tracking company. However, if the pet roams onto another LPWAN, for example by travelling to a different country, then the other LPWAN may not know how to forward the message and there may not be an agreement in place between the pet tracking service and the other LPWAN.

Accordingly, one example of the present application proposes a method for managing roaming between low power wide area networks (LPWANs) based on at least one of a network ID and an application ID included in a message from the IoT device. The message including at least one of a network ID and an application ID means that the message includes a network ID, or the message includes an application ID or the message includes both a network ID and an application ID. In this way roaming permission may be managed at the level of all devices belonging to a LPWAN, or at the application level, rather than at the level of individual devices. This may be more efficient and practical for IoT where there may be a very large number of devices. In one example, a first LPWAN receives a message including at least one of a network ID associated with a second LPWAN and an application ID associated with a second LPWAN. In response to a determination that at least one of the network ID and the application ID are on a roaming white list of the first LPWAN, the first LPWAN causes the message to become available to the second LPWAN. A determination that at least one of the network ID and the application ID are on a roaming white list of the first LPWAN means a determination that the network ID, the application ID or combination of the network ID and the application ID are on the white list.

In another example, a message from a roaming IoT device is received by a roaming device data server (RDDS). The RDDS stores the messages and sends a notification to the home network of the roaming IoT device. In this way the home network may be notified even if a formal roaming agreement is not in place. Further, the message may be stored until a roaming agreement is in place, or the home network may be allowed to access the stored messages on a request basis.

Examples will now be described in more detail with reference to the accompanying drawings.

Figure 1:
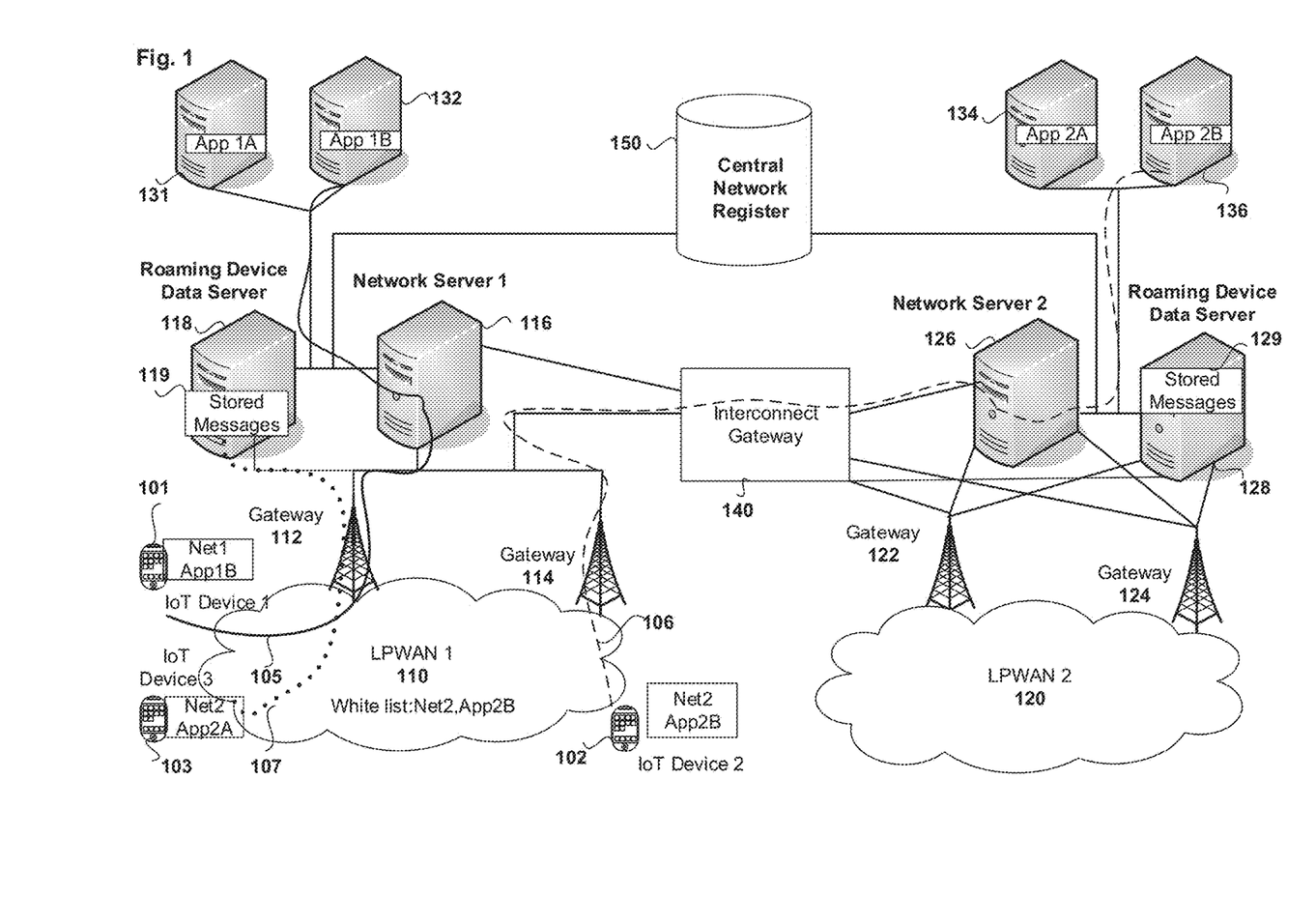
FIG. 1 shows an example of a first Low Power Wide Area Network (LPWAN), a second LPWAN and an IoT device roaming between the first LPWAN and the second LPWAN.

FIG. 1 shows an example of a first LPWAN and a second LPWAN. The first LPWAN 110 includes a plurality of gateways 112 and 114. Likewise the second LPWAN 120 includes a plurality of gateways 122 and 124. For example, the first LPWAN 110 may be a LPWAN in a first country or state, while the second LPWAN 120 may be a LPWAN in a second country or state. The gateways act as the base stations to wirelessly transmit signals to and receive signals from IoT devices. While just two gateways are shown in FIG. 1, it is to be understood that in practice there may be a much large number of gateways in each LPWAN. The gateways 112, 114 of the first LPWAN 110 connect to a network server 116 of the first LPWAN. While just one network server 116 is shown in FIG. 1, depending on the size of the LPWAN there may be a large number of network servers. The gateways 112, 114 may connect to the network server 116 via a wired or wireless network, for instance fiber optic cable, an Ethernet network etc. The network server 116 and gateways 112, 114 may be considered to be part of the first LPWAN and may be owned by the same LPWAN operator.

The network server 116 may route traffic between the gateways and application servers 131, 132 which host applications associated with the IoT devices, such as tracking or monitoring services etc. Thus, as shown in FIG. 1, application server 131 hosts application 1A, while application server 132 hosts application 1B. The application servers may be physical servers, virtual machines or cloud hosted applications. In some cases applications servers may be hosted in a cloud or data center provided by the LPWAN operator, while in other cases they may be hosted separately from the LPWAN. The network server 116 may communicate with the application servers over any suitable network, such as a local area network (LAN), telecommunications network, fiber optic network, or the Internet etc. The second LPWAN likewise includes a network server 126 which is to forward messages between the LPWAN and application servers 134, 136 hosting applications 2A and 2B.

As shown in FIG. 1, IoT device 101 wirelessly sends a message to gateway 112, which is destined for application 1B. The gateway 112 forwards the message to network server 116 and the network server 116 forwards the message to the application server 132, as illustrated by the route 105 shown with a solid line in FIG. 1. The network server 116 may forward the message to the application server 132 based on an application ID 'App 1B' in a message header from the IoT device and a routing table of the network server. This is an example of forwarding in a home network, as the IoT device 101 belongs to the first LPWAN.

In another example, IoT device 102 shown in FIG. 1, belongs to the second LPWAN 120, but is roaming as a visiting IoT device on the first LPWAN 110. The IoT device 102 sends a message to gateway 114 of the first LPWAN, where the message is destined for application 2B. The route of the message is shown by the dashed line 106. The gateway 114 forwards the message to the network server 126 of the second LPWAN via an interconnect gateway 140, which is a switching device to facilitate forwarding between different LPWANs. The network server 126 of the second LPWAN then forwards the message to application server 136 which hosts the application 2B. In one example, the gateway 114 and the interconnect gateway 140 may forward the message to the second LPWAN based on a network ID in the message which indicates the second LPWAN. The network ID may be in a header of the message. The network server 126 of the second LPWAN may forward the message to the application server 136, based on an application ID in a header of the message.

The above example assumes that roaming is allowed between the first LPWAN and the second LPWAN. However, that may not always be the case. For example, the first LPWAN and second LPWAN may not have a roaming agreement in place. Or, roaming may be desired for some applications and not for others. For instance, a cargo tracking application may desire roaming, while a bicycle tracking application may not. If a stolen bike has been transferred overseas, then it is probably cheaper to buy a new one than attempt to retrieve it. For pet tracking, it is to be expected that a pet may usually remain within the coverage of a single LPWAN, but if the pet ventured into another LPWAN the owner may still want to receive messages to find out where the pet is.

Further, the roaming mechanisms used by WLAN and conventional 3G networks may not be optimum for IoT scenarios. WLAN and 3G networks may allow or forbid roaming on a per device basis—for example by MAC address or SIM—which may not be practical if there are very large numbers of devices. Further, 3G and WLAN roaming may require the roaming device to complete an authentication handshake to join the visited network. This may entail a delay while waiting for roaming permission to be granted to the individual device by the home network. WLAN and 3G methods may also request the roaming device to send or receive further messages to authenticate the device to the home network and/or to join the visited network. However, IoT devices may be designed to send a message and then shut down to conserve battery. Therefore, it may not be possible to guarantee that the IoT device will be awake to receive the follow-up registration or authentication messages, after sending the initial message, and even if the IoT device is awake such further communications may deplete the battery life further. Furthermore, complicated or involved authentication and roaming handshakes may impose a larger overhead compared to the volume of data which the IoT device is to send or receive. Example methods which may provide a flexible and efficient roaming procedure will now be described.

Figure 2:
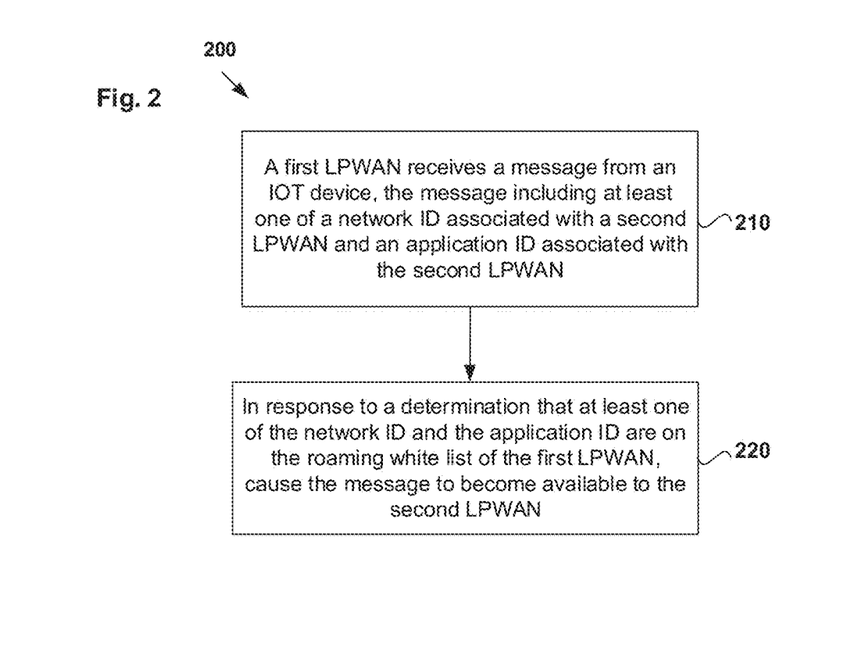
FIG. 2 is a flow diagram of an example method of managing a message from a roaming IoT device according to the present disclosure.

FIG. 2 shows an example method 200 of managing roaming between a first LPWAN and a second LPWAN.

At block 210, a first LPWAN receives a message from an IoT device. The message includes at least one of a network ID associated with a second LPWAN and an application ID associated with a second LPWAN.

For example, the message may be received by a gateway of the first LPWAN. Based on the network ID or application ID, the first LPWAN may determine that the IoT device is a roaming device that is visiting the first LPWAN.

At block 220, in response to a determination that at least one of the network ID and the application ID are on a roaming white list of the first LPWAN, the message is made available to the second LPWAN. For example, the message may be made available by forwarding the message to second LPWAN, or by allowing the second LPWAN to retrieve the message. In one example a gateway of the first LPWAN forwards the message to a network server of the second LPWAN via an interconnection gateway. Retrieving the message may include the second LPWAN reading the message or downloading the message.

The roaming white list may include at least one of following types of entry: an entry indicating a network ID for which roaming is allowed, an entry indicating an application ID for which roaming is allowed, and an entry indicating a combination of a network IDs and application IDs for which roaming is allowed. A determination that at least one of the network ID and the application ID of the message are on a roaming white list of the first LPWAN means a determination that the network ID, application ID or combination of the network ID and application ID are on the white list.

The white list may be stored in a central server of the first LPWAN and local copies may be cached in gateways of the first LPWAN. The central server of the first LPWAN may store certain settings of the first LPWAN and may be accessible by, or may send data or instructions to, the gateways of the first LPWAN. The central server may be one of the network servers of the first LPWAN or may be a separate server. In general the function of the network servers is to route traffic, while the function of the central server is to store settings and policies.

Figure 3A:
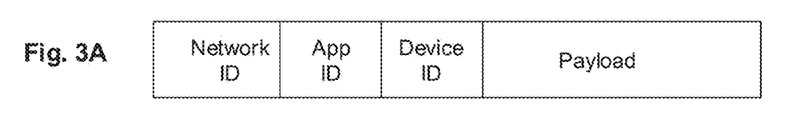
FIG. 3A shows an example structure of a message from an IoT device according to the present disclosure.
Figure 3B:
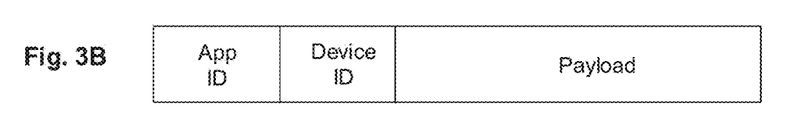
FIG. 3B shows another example structure of a message from an IoT device according to the present disclosure.

For further understanding of the above method, please refer to the example messages from an IoT device shown in FIGS. 3A and 3B.

FIG. 3A shows an example message which comprises a header and a payload. The payload may include application data for use by the application for which the message is destined. For instance, data from a sensor of the IoT device. By way of non-limiting example, the payload may for example include data relating to a location of the IoT device, a temperature of the IoT device, weight, data relating to a sensed environment of the IoT device, or data relating to a product monitored by a sensor of the IoT device. The header includes a network ID, an application ID and a device ID. The network ID may indicate a home network of the IoT device, the application ID may indicate an application which the message is destined for and the device ID may be an identifier of the device.

FIG. 3B shows an example message which is the same as the message of FIG. 3A except that there is no separate network ID in the header. In this case, the network ID may be a part of the application ID, for instance the first or last few digits of the application ID. In another example, the visited network may be able to determine the home network which the application ID is associated with by referring to an application register linking or mapping application IDs to LPWANs which the application IDs are associated with. Such a list may be stored in each LPWAN or on a remote server accessible by the LPWANs.

In general terms, it will be appreciated that the message includes at least one of a network ID and an application ID. In some cases the network ID may be a part of the application ID. The device ID may be authenticated by the home network, which in this case is the second LPWAN, to verify that the IoT device is an authentic and authorized IoT device which is registered to the home network. In some examples, the device ID may be encrypted by a key which is known to the home network, which in this case is the second LPWAN, but which is unknown by the visited network, which in this case is the first LPWAN. Thus the home network may authenticate the identity of the IoT device by decrypting the device ID. In addition to providing secure authentication, encryption of the device ID may also provide anonymity and help to prevent unauthorized third parties from tracking an IoT device. This may be desired if, for example, the IoT device is associated with a valuable product.

The method of FIG. 2 may allow the first LPWAN to quickly and efficiently forward messages for which a roaming agreement is in place. It may be efficient as the first LPWAN may determine if the message is on a roaming white list based on a network ID, application ID or combination of network ID and application ID. The first LPWAN can check roaming is allowed and forward to the correct network and application without knowing the device ID of the IoT device. Furthermore, the roaming process may be transparent to the IoT device. The IoT device may send the message in the same way as if it was on its home LPWAN and need not be aware that it is roaming. The message may be sent by the IoT device, without the IoT device first sending a prior request to join the first LPWAN as a roaming device. Checking for roaming permission is handled by the LPWAN and so the IoT device may shut down after sending the message and need not stay awake to complete an authentication procedure. Thus, in some examples, an IoT device belonging to the second LPWAN, may simply send the message to the first LPWAN and the first LPWAN may determine that roaming is allowed and forward the message to the second LPWAN, without the IoT device completing a roaming handshake or communicating further messages relating to roaming.

However, in some examples roaming permission may be explicitly forbidden by the home network or application of the IoT device. In still other cases, the first LPWAN on which the IoT device is roaming, may not know whether or not roaming is allowed by the home LPWAN. Methods for dealing with these scenarios are explained in more detail below with reference to FIG. 4.

Figure 4:
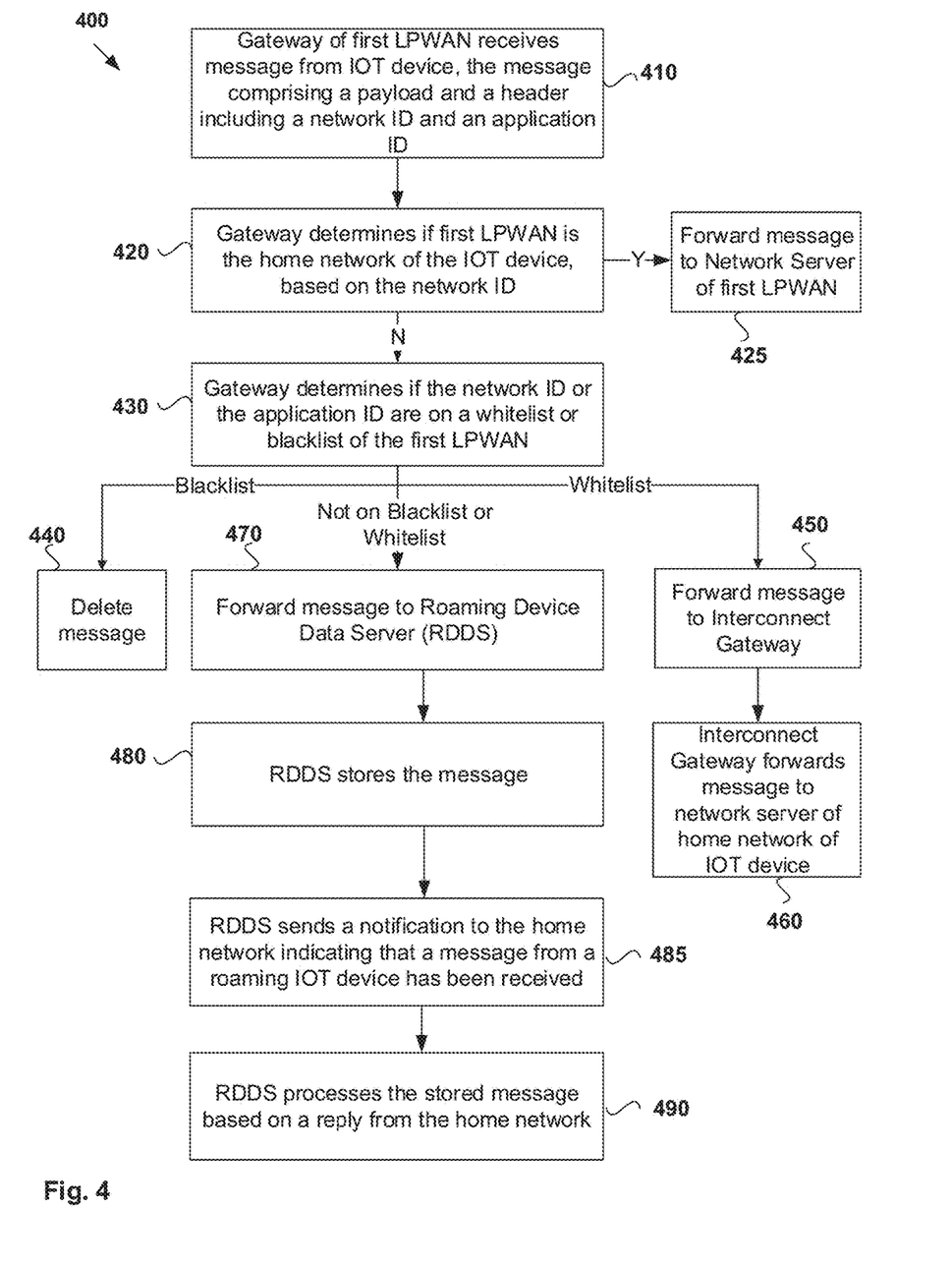
FIG. 4 is a flow diagram of an example method of managing a message from a roaming IoT device according to the present disclosure.

FIG. 4 shows an example of a method 400 of managing messages from roaming devices in more detail. The method assumes that the message includes both a network ID and an application ID, but may be modified to work with messages that include just an application ID or just a network ID.

At block 410 a gateway of the first LPWAN receives a message from an IoT device. The message comprises a payload and a header including a network ID and an application ID.

At block 420 the gateway determines whether the first LPWAN is the home network of the IoT device, based on the network ID.

If the first LPWAN is the home network of the IoT device, then the method proceeds to block 425 where the gateway forwards the message to a network server of the first LPWAN.

If the first LPWAN is not the home network of the IoT device, then the method proceeds to block 430.

At block 430, the gateway determines whether the network ID or the application ID are on a whitelist or a blacklist of the first LPWAN.

If the network ID or the application ID are individually on the black list, or the combination of the network ID and application ID together are on the black list, then the method proceeds to block 440 at which the message is deleted or dropped by the gateway. The black list may thus act as a filtering mechanism to help prevent repeatedly forwarding messages to LPWANs which have already indicated that roaming is not allowed for IoT devices roaming on the first network or that roaming is not allowed for messages relating to certain applications.

If the network ID is on the white list as an entry indicating that roaming is allowed for all messages including the network ID, regardless of application, then the method proceeds to block 450. If the application ID is on the white list as an entry indicating that roaming is allowed for all messages including this application ID, then the method proceeds to block 450. For instance this type of entry may be used if the application ID is globally unique and includes the network ID. If an entry on the white list includes the application ID and the network ID as a combination, this indicates that roaming is allowed for messages which include both the application ID and the network ID, and the method proceeds to block 450.

At block 450, the gateway forwards the message to an Interconnect Gateway and the method proceeds to block 460. At block 460 the Interconnect Gateway forwards the message to a network server of the home network of IoT device.

In one example, the network server of the home network may then route the message to the appropriate application server which hosts the application identified by the application ID.

The white list may help to facilitate efficient forwarding of messages to a second LPWAN which has indicated that roaming on the first LPWAN is allowed in respect of all of IoT devices belonging to the second LPWAN or that roaming is allowed for messages relating to certain applications.

The white list and the black list may be stored on a central server of the first LPWAN and may be updated as roaming agreements are put in place or when it is determined that roaming should not be allowed for certain applications or LPWANs. The gateways of the first LPWAN may locally store copies of the white list and black list and may update them regularly.

In some cases the first LPWAN may have insufficient information to determine to process the message. For example, if a message includes a network ID, application ID or combination thereof which is not on a white list or black list then the first LPWAN will not know whether or not roaming should be permitted. In such cases, the message may be forwarded to a roaming device data server (RDDS) at block 470. An example is shown in FIG. 1 where IoT device 103, which belongs to the second LPWAN 120, is roaming on the first LPWAN 110. IoT device 103 sends a message including network ID 2 and application ID 2A to gateway 112 of the first LPWAN. As the white list of LPWAN 110 does not give roaming permission to all messages including network ID and does not include the combination of network ID 2 and application ID 2A, the gateway 112 forwards the message to the RDDS 118 of the first LPWAN. This is shown by the forwarding path 107 which uses dotted lines in FIG. 1.

At block 480 in response to receiving the message, the RDDS stores the message. An example of a RDDS 118 and messages 119 stored on the RDDS is shown in FIG. 1. Each LPWAN may include its own RDDS and FIG. 1 also shows a RDDS 128 of the second LPWAN and the messages 129 stored by the second RRDS 128.

The RDDS may help the LPWAN to handle messages including network IDs or application IDs that are unknown to the LPWAN, network IDs or application IDs which are known but for which no roaming agreement is currently in place. The RDDS may also be used where a more flexible response is desired, rather than simply forwarding all messages which include a particular network ID, application ID or combination thereof.

At block 485 the RDDS sends a notification to the home network indicating that a message has been received from a roaming IoT device belonging to the home network. The home network is, for example, the LPWAN associated with the network ID included in the message received at block 410. If the RDDS does not know how to reach the LPWAN associated with the network ID, then it may look the LPWAN up in a Central Network Register 150 shown in FIG. 1. The notification sent to the home network may be in respect of a single message, or may be in respect of a plurality of messages collected over a period of time from the same or different IoT devices.

The Central Network Register (CNR) 150 is a database including LPWAN network IDs and routing information for a plurality of LPWANs to enable one LPWAN to route requests and messages to another LPWAN. For example the routing information for a network ID may include the address of a network server of the LPWAN which the network ID corresponds to. The Central Network Register may be managed by a national organization, international organization or industry body and may include all known official LPWANs in a particularly geographic region or worldwide. The CNR may be hosted on a server. Several mirror versions of the CNR may be regularly synchronized with a master version to enable easy access to a CNR from different areas of the globe.

At block 490 the RDDS processes the message based on a reply from the home network.

It will be noted that in the above method, the message is stored by the RDDS at block 480, the RDDS then notifies the home network and subsequently determines how to process the message. The method does not necessarily require the IoT device to send or receive further messages relating to authentication, such as an authentication handshake. Nor does the method necessarily require the IoT device to send a join request to the LPWAN separately from the message which includes the payload with actual data for use by the IoT application. Therefore the IoT device may temporarily power down, disconnect or stop listening to the LPWAN and the message will not be lost. The RDDS may store the message from the roaming IoT device for a significant period of time. e.g. several hours, days, weeks or even months, until a determination is made as to how to the process the message.

Furthermore, the way in which the message is processed may, in some implementations, be quite flexible, as will become apparent from the following description and drawings.

Figure 5:
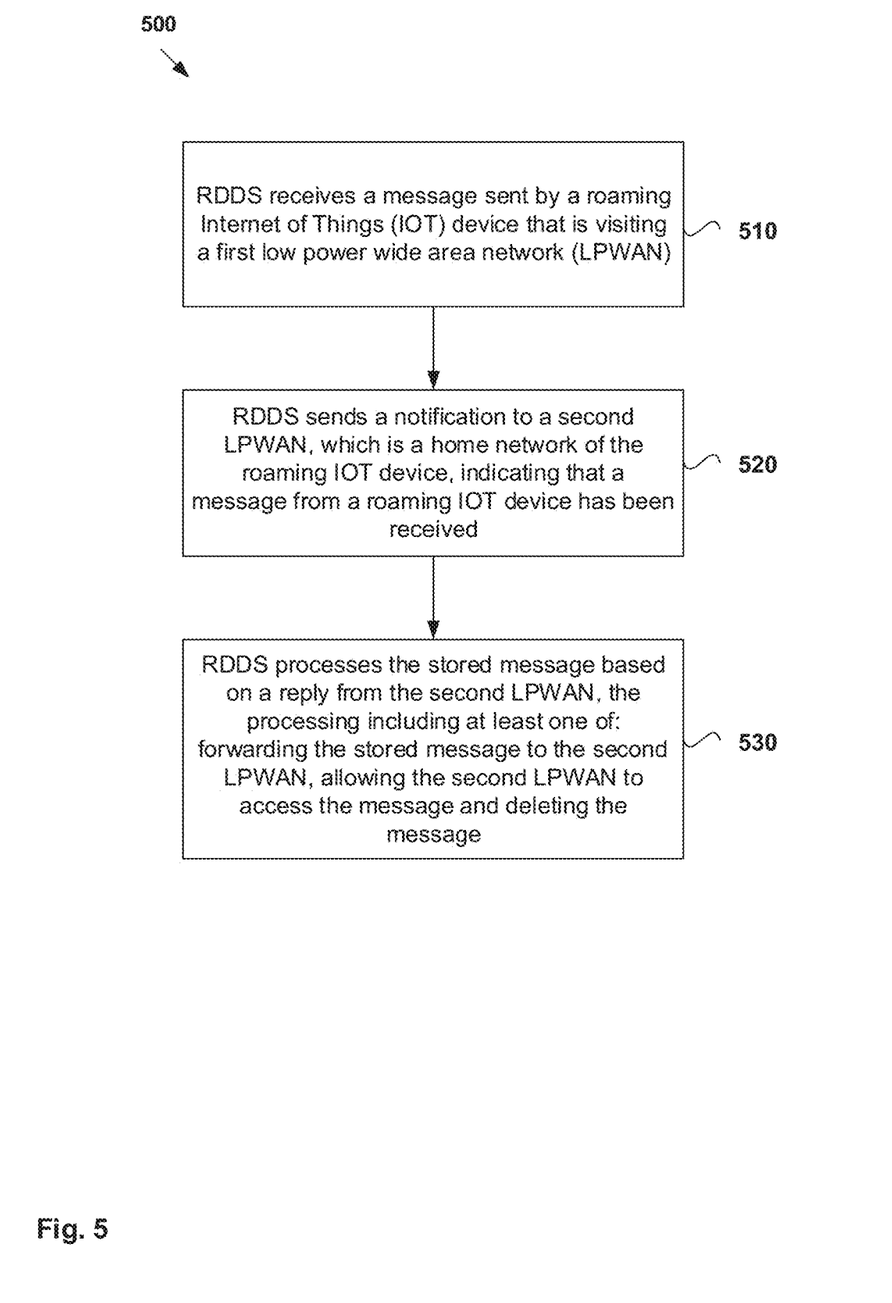
FIG. 5 is a flow diagram showing an example method employed by a roaming device data server (RDDS) according to the present disclosure.

FIG. 5 shows an example method of operation 500 of an RDDS.

At block 510 the RDDS receives a message sent by a roaming Internet of Things (IoT) device that is visiting a first low power wide area network (LPWAN).

At block 520 the RDDS sends a notification to a second LPWAN, which is a home network of the roaming IoT device, indicating that a message from a roaming IoT device has been received. This notification may be in respect of a single message, or may be in respect of a plurality of messages collected over a period of time from the same or different IoT devices.

At block 530 the RDDS processes the stored message based on a reply from the second LPWAN. The phrase "based on a reply from the second LPWAN" should be interpreted broadly to include the presence or absence of a reply within a predetermined period of time, or the content of a received reply. The processing may include performing at least one of: forwarding the stored message to the second LPWAN, allowing the second LPWAN to access the message and deleting the message.

Figure 6:
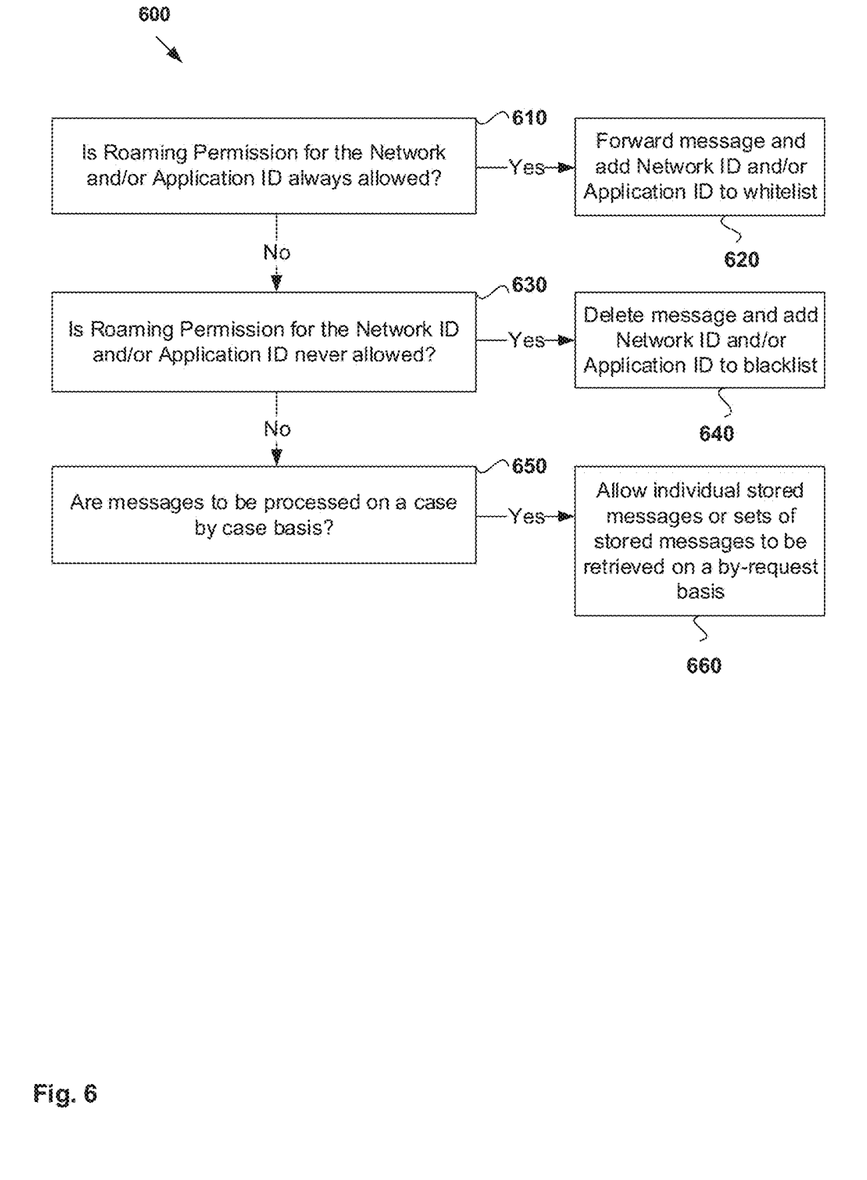
FIG. 6 is a flow diagram showing another example method employed by a roaming device data server (RDDS) according to the present disclosure.

The flowchart 600 of FIG. 6 shows various possibilities which may be based on a reply from the second LPWAN.

In FIG. 6 and elsewhere in this application, the phrase "Network ID and/or Application ID" is used as shorthand for "at least one of the network ID and the application ID" and expresses the following three possibilities: the network ID, the application ID or the combination of the network ID and the application ID.

At block 610 it is determined if roaming permission for the network ID and/or Application ID is always allowed. For example, this may be based on a reply from the second LPWN giving roaming permission for the network ID and/or application ID. In this case, at block 620 the network ID and/or Application ID may be added to a white list of the first LPWAN, and the message may be forwarded to a network server of the second LPWAN. Where a plurality of messages including the network ID and/or application ID have already been received and stored by the RDDS they may be all be forwarded or otherwise made available to the second LPWAN.

The forwarding path from the RDDS 118 of the first LPWAN to a network server 126 of the second LPWAN is not shown in FIG. 1, but may go via the Interconnect Gateway 140. The network server 126 of the second LPWAN may forward the message to the appropriate application server, for instance application server 134 for a message destined for application 2A.

At block 630 it may be determined if roaming permission for the network ID and/or application ID are never allowed. For example, this may be in response to explicit refusal for roaming permission from the second LPWAN. In that case, at block 640 the network ID and/or application ID may be added to a black list of the first LPWAN.

At block 650 it is determined if messages with a particular network ID and/or application ID are to be processed on a case by case basis. For example, this may be in response to a reply from the second LPWAN requesting this arrangement.

In this case the method proceeds to block 660 at which the RDDS allows individual stored messages or sets of stored messages to be retrieved on a by-request basis by the second LPWAN. Retrieval may include reading the messages or downloading the messages etc.

In one example, the method may include the RDDS allowing the second LPWAN to access information relating to stored messages which were received by the RDDS from IoT devices belonging to the second LPWAN. For example, the RDDS may provide the second LPWAN with statistics such as the number of messages, application IDs to which the messages relate, number of messages relating to each application ID, device IDs from which the messages were received, time period in which messages were received, size of the messages, a message identifier or even a part of the message payload such as a message title etc. The RDDS may allow the second LPWAN to retrieve individual stored messages or sets of stored messages on a by-request basis. In this way the second LPWAN may allow or disallow roaming of messages on a case by case basis, or may evaluate the volume of messages received over a period of time to determine whether or not it is worthwhile to establish a roaming agreement and/or for which applications a roaming agreement would be desirable.

In one example, the method may include the RDDS storing a plurality of messages received from IoT devices belonging to the first LPWAN, allowing the second LPWAN to access information relating to the plurality of stored messages and allowing the second LPWAN to retrieve, on a request basis, at least one message from among said plurality of stored messages.

In some implementations, failure to receive a reply from the second LPWAN to a notification of a roaming IoT device within a predetermined period of time, may be taken as refusal for roaming permission and the method may proceed to block 640 as above. In other cases, the method may proceed to block 640 after failure to receive a reply to a plurality of notifications may be taken as refusal and the method may proceed to block 640. In still other methods, failure to receive a reply may be interpreted as inconclusive and the method may proceed to block 650.

Furthermore, in response to receiving a message sent by a roaming IoT device, the RDDS may send a notification informing the roaming IoT device that the IoT device is roaming outside its home network. This may be done in all cases, or in one or more of the following cases: when the application ID and/or network ID are on a white list, the application ID and/or network ID are on a black list, or where the application ID and/or network ID are neither on a black list nor on a white list. If the application ID and/or network ID are on a black list then notifying the IoT device that it is roaming may be helpful as the IoT device may then know that its messages will not be forwarded. However, even if the application ID and/or network ID are on a white list, this information may still be useful for the IoT device, as the roaming may incur charges or otherwise impact the behavior or desired behavior of the IoT device. This is particularly the case where the roaming is transparent to the IoT device, as in that case the IoT device may not otherwise know that it is roaming. For instance the roaming may be transparent to the IoT device if the IoT device does not send a join request to the visited network or does not complete special authentication handshake for roaming.

Figure 7:
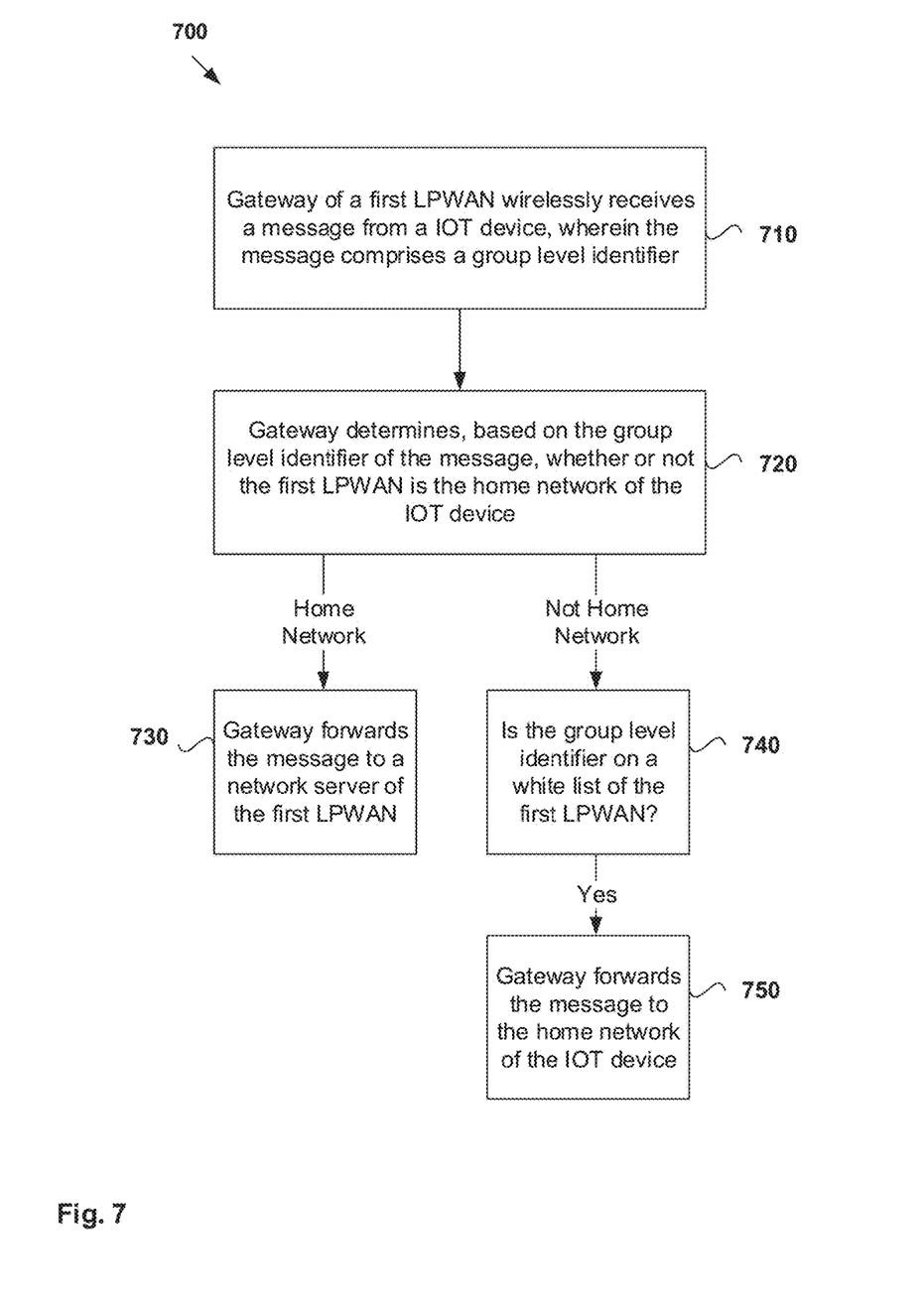
FIG. 7 is a flow diagram showing an example method employed by a gateway according to the present disclosure.

Method 700 of FIG. 7 shows an example method which may be employed by a gateway of a LPWAN.

At block 710 a gateway of a first LPWAN wirelessly receives a message from an IoT device. The message comprises a group level identifier. A group level identifier is an identifier which corresponds to a plurality of IoT devices. The group level identifier may be used to identify a plurality of IoT devices which belong to the same group.

The group level identifier may be at least one of a network ID and an application ID. For example, a group level identifier may be a network ID of a home LPWAN of an IoT device, in which case it includes all devices that belong to that specific home LPWAN. The group level identifier may be an application ID, in which case it may apply to all IoT devices associated with that application at least when they are sending a message relating to the application. The group level identifier may be a combination of a network ID and an application ID in which case it applies to all IoT devices which belong to the LPWAN associated with the network ID and which are associated with the application.

At block 720 the gateway determines, based on the group level identifier of the message, whether or not the first LPWAN is the home network of the IoT device.

In response to a determination that the first LPWAN is the home network of the IoT device, the method proceeds to block 730. At block 730 the gateway forwards the message to a network server of the first LPWAN.

In response to a determination that the first LPWAN is not the home network of the IoT device, this means the IoT device is roaming on the first LPWAN and so the method proceeds to block 740.

At block 740 the gateway determines whether the group level identifier is included in a white list of the first LPWAN. If the group level identifier is included in the whitelist then the method proceeds to block 750 where the gateway forwards the message to the home network of the IoT device.

Further, if the group level identifier is included in a black list, the gateway may delete the message. If the group level identifier is included in neither a white list nor a black list then the gateway may forward the message to a RDDS.

Figure 8:
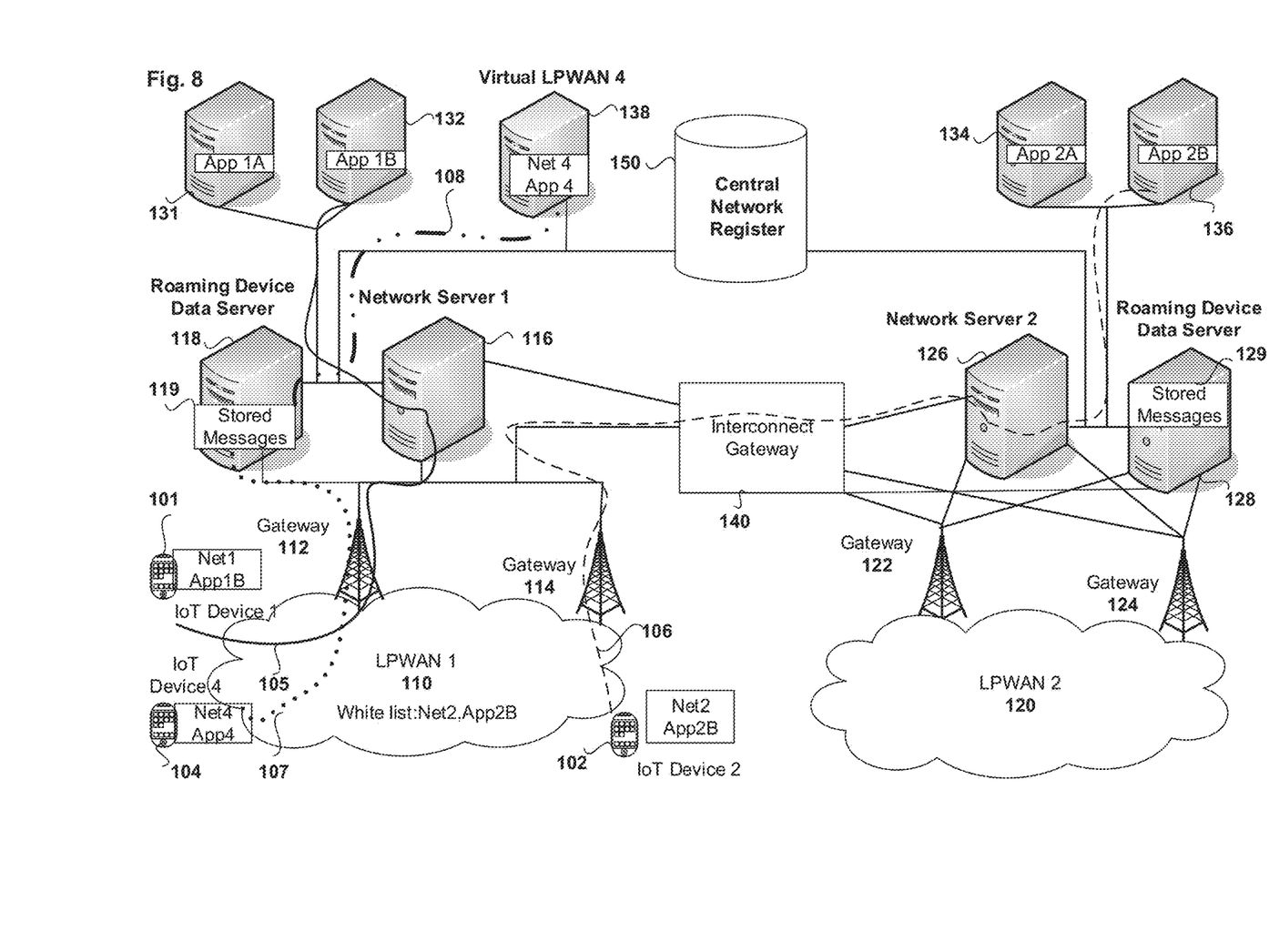
FIG. 8 shows an example of a plurality of physical LPWANs and a virtual LPWAN according to the present disclosure.

In FIG. 1 both the first LPWAN 110 and the second LPWAN 120 are physical LPWANs. A physical LPWAN includes at least one gateway and at least one network server, and is associated with a network ID. However, it is possible to have a virtual LPWAN which is not associated with any gateways. A virtual LPWAN may for example include a network server and may be associated with a network ID. The network ID may be communicated to and stored in the Central Network Register 150. FIG. 8 shows an example virtual LPWAN 4 which has a network ID 'Net 4' and includes a network server 4 which hosts application 4. When a gateway of a physical LPWAN receives a message including a network ID 4 and/or application ID 4 associated with a virtual LPWAN 4 it may not know the network ID or application and may therefore forward the message to the RDDS, as shown by the dashed and dotted line 107. The RDDS 118 may look up the network ID 4 and/or application ID 4 on the Central Network Register 150 and then process the message accordingly, as described above for a normal physical LPWAN. For example, the RDDS 118 may determine that a roaming agreement is in place and may forward the message to the network server 138 of the virtual LPWAN 4 or allow the network server 138 of the virtual LPWAN 4 to retrieve the message. In this way service providers or operators may set up a virtual LPWANs to facilitate forwarding of messages to applications without the expense of investing in a physical LPWAN including physical gateways.

Figure 9:
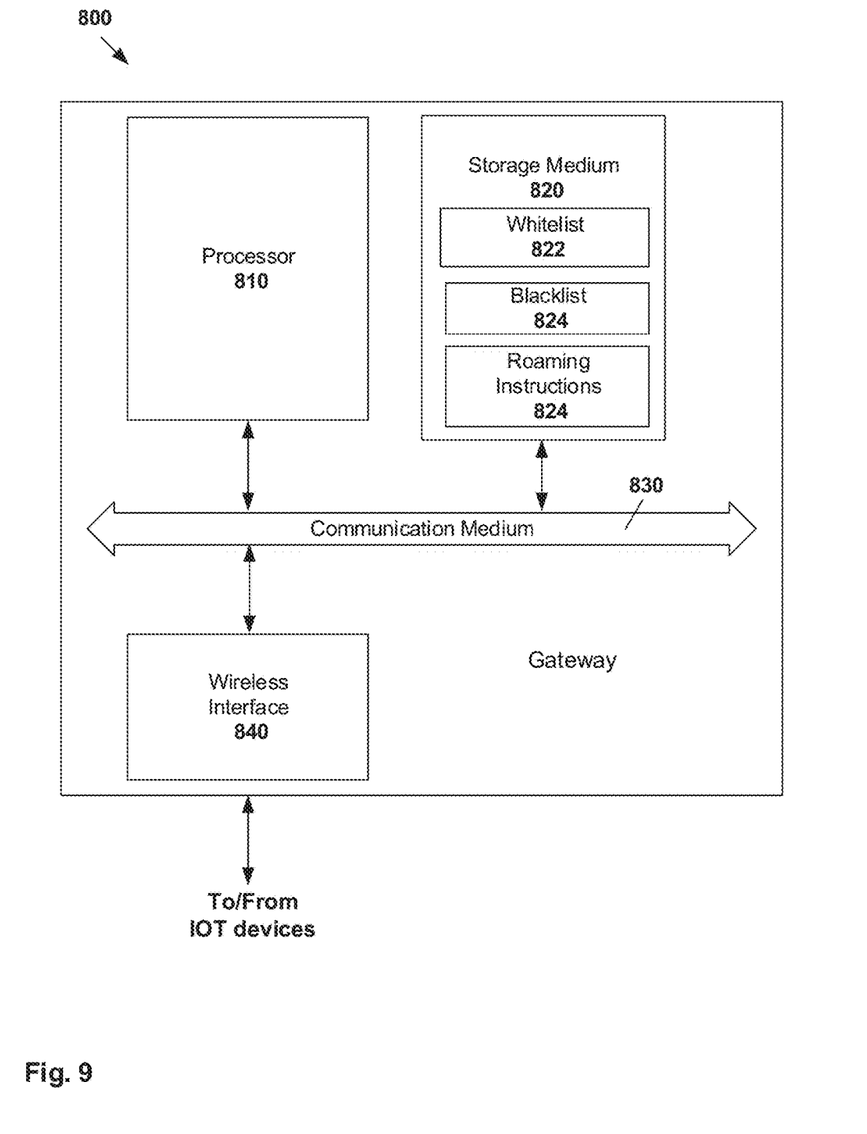
FIG. 9 shows an example structure of a gateway according to the present disclosure.

FIG. 9 shows an example structure of a gateway 800 according the present disclosure. For example, the gateways 112, 114, 122 and 124 in FIGS. 1 and 8 may have this structure. The example gateway 800 includes a processor 810, a non-transitory storage medium 820 and a wireless interface 840. The processor 810, storage medium 820 and wireless interface 840 may be connected with each other via a communication medium 830, such as a bus or switch etc.

The wireless interface 840 may include a radio transceiver and radio antenna for wirelessly transmitting and receiving messages to and from IoT devices in accordance with a LPWAN technology. The processor 810 may be a microprocessor, central processing unit embedded processor, application specification integrated circuit, field programmable gate array or combination of several such processors and may execute machine readable instructions to implement any of the methods described herein. The storage medium 820 is a machine readable non-transitory storage medium which may store data and/or instructions that are accessible by the processor 810. The storage medium 820 may be a single storage medium or plurality of storage mediums and may include any of random access memory, read only memory, flash memory, a hard disk or storage array etc.

The storage medium 820 may store a white list 822 and/or a black list 824 as described above. The white list and/or black list may be a copy of a master white list or black list stored in a central server of the LPWAN to which the gateway belongs. The storage medium 820 may store machine readable instructions which are executable by the processor 810 to implement any of the methods described herein. The machine readable instructions may include roaming instructions 824 to handle messages from roaming IoT devices, in accordance with any of the methods described herein. For example, the roaming instructions 824 may be instructions to handle a message from a roaming IoT device in accordance with the methods shown in FIG. 2, 4 or 7.

Figure 10:
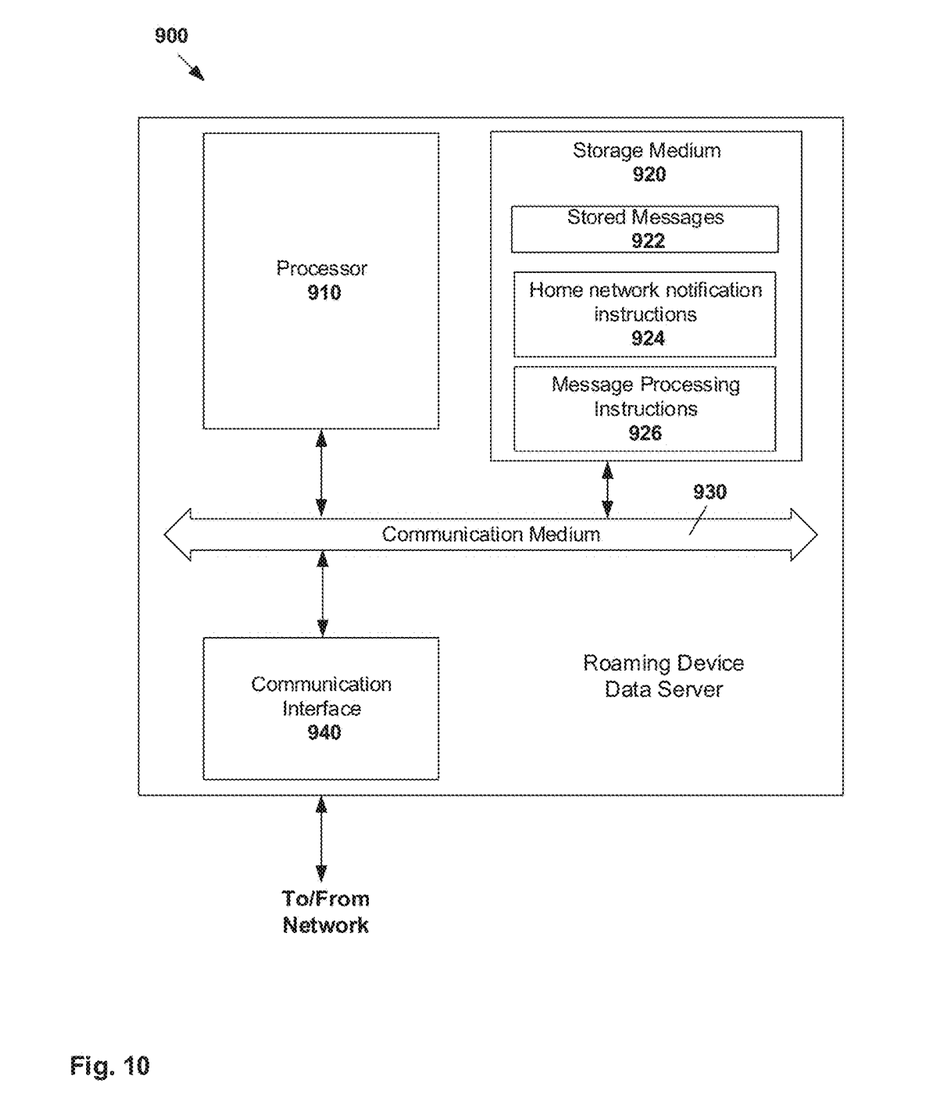
FIG. 10 shows an example structure of an RDDS according to the present disclosure.

FIG. 10 shows an example structure of a Roaming Device Data Server (RDDS) 900 according the present disclosure. For example, the RDDS 118 and RDDS 128 in FIGS. 1 and 8 may have this structure. The example RDDS 900 includes a processor 910, a non-transitory storage medium 920 and a communication interface 940. The processor 910, storage medium 920 and wireless interface 940 may be connected with each other via a communication medium 930, such as a bus or switch etc.

The communication interface 940 may be a communication interface for sending data to and receiving data over a network such as LAN, a WAN, the Internet, a telecommunications network, optical network etc. The communication interface may send and receive data to gateways of the LPWAN which the RDDS belongs to. The communication interface may also send and receive data to or from the Central Network Register 150, LPWAN network servers, application servers and an Internetwork Gateway.

The processor 910 may be a microprocessor, central processing unit embedded processor, application specification integrated circuit, field programmable gate array or combination of several such processors and may execute machine readable instructions to implement any of the methods described herein. The storage medium 920 is a machine readable non-transitory storage medium which may store data and/or instructions that are accessible by the processor 910. The storage medium 920 may be a single storage medium or plurality of storage mediums and may include any of random access memory, read only memory, flash memory, a hard disk or storage array etc.

The storage medium 920 may store messages 922 received from roaming IoT devices as described in the methods above. The messages may have been forwarded to the RDDS by a gateway of a LPWAN on which the IoT device was roaming and may have been received by the communication interface 940 of the RDDS. The storage medium 920 may store machine readable instructions which are executable by the processor 910 to implement any of the methods described herein. For example, the methods of FIGS. 4, 5 and 6.

The RDDS may form part of a specific LPWAN and may be hosted or owned by said LPWAN provider. The machine readable instructions may include notification instructions 924 to notify other LPWANs of any messages received from IoT devices belonging to said other LPWAN. The machine readable instructions may include message processing instructions 926 to process the stored messages 922 in accordance with any of the methods described herein. For example, but not limited to, the methods of FIGS. 5 and 6. The processing may include, for example, forwarding a stored message to another LPWAN, allowing the another LPWAN to access the message or deleting the message.

All of the features disclosed in this specification (including any accompanying claims, abstract and drawings), and/or all of the blocks of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise.

What is claimed is:

1. A method of managing roaming between low power wide area networks (LPWANs) comprising:
receiving, by a gateway within a first LPWAN, a message from an Internet of Things (IoT) device, the message including at least one of: a network ID associated with a second LPWAN and an application ID associated with the second LPWAN;
in response to a determination, by the gateway within the first LPWAN, that the gateway has insufficient information to process the message, forwarding the message from the gateway to a roaming data server (RDDS) for storage;
based on forwarding the message to the RDDS, notifying the second LPWAN that the message has been received and determining how to process the message based on a response from the second LPWAN; and
in response to a determination that at least one of the network ID and the application ID are on a roaming white list of the first LPWAN, causing the message to become available to the second LPWAN.

2. The method of claim 1 wherein the message includes a combination of the network ID and the application ID and wherein the determination is a determination that the roaming white list includes said combination of the network ID and the application ID.

3. The method of claim 1 wherein receiving the message from the IoT device includes receiving the message by a gateway within the first LPWAN and the method comprises:
in response to a determination that at least one of the network ID and the application ID are on a roaming blacklist, deleting the message.

4. The method of claim 1 comprising, in response to a determination that roaming is allowed for IoT devices associated with at least one of the network ID and the application ID, placing the at least one of the network ID and application ID on the roaming white list and forwarding the message to the second LPWAN.

5. The method of claim 1 wherein a header of the message includes an IoT device ID that is encrypted by a key, wherein the key is known to the second LPWAN and remains unknown to the first LPWAN.

6. The method of claim 1 wherein the message comprises a header and a payload, the header including the at least one of the network ID and the application ID and the payload including application data for use by an application associated with the application ID.

7. The method of claim 1 wherein the second LPWAN is one of: a physical LPWAN including a gateway and a virtual LPWAN without a gateway.

8. The method of claim 1 wherein the message from the IoT device is received by the first LPWAN and forwarded by the first LPWAN to the second LPWAN.

9. A roaming device data server (RDDS) comprising:
a communication interface to receive a message sent by a roaming Internet of Things (IoT) device that is visiting a first low power wide area network (LPWAN);
a non-transitory computer readable storage medium to store the message; and
a processor to:
send a notification to a second LPWAN, which is a home network of the roaming IoT device, the notification indicating that the message from the roaming IoT device has been received;
based on a reply from the second LPWAN, perform at least one of forward the stored message, allow the second LPWAN to access the stored message, and delete the message; and in response to a receipt by the communication interface of roaming permission from the second LPWAN in respect of at least one of an application ID and a network ID, cause the at least one of the application ID and the network ID to be added to a roaming white list that is accessible by a number of gateways of the first LPWAN.

10. The roaming device data server of claim 9 wherein the message includes data relating to a location of the IoT device, a temperature of the IoT device, weight data, data relating to a sensed environment of the IoT device, or data relating to a product monitored by a sensor of the IoT device.

11. The roaming device data server of claim 9 wherein in response to receipt by the communication interface of roaming permission from the second LPWAN, the processor is to forward the message to the second LPWAN.

12. The roaming device data server of claim 9, wherein the processor is to, in response to receipt of roaming permission from the second LPWAN in respect of at least one of a network ID and an application ID, the processor is to forward or otherwise make available to the second LPWAN, a plurality of stored messages that were previously received by the RDDS and which messages include a header comprising the at least one of the network ID and the application ID for which roaming permission is granted.

13. The roaming device data server of claim 9 wherein:
the non-transitory computer readable storage medium is to store a plurality of messages received from IoT devices belonging to the second LPWAN; and
the processor is to allow the second LPWAN to access information relating to the plurality of stored messages and allow the second LPWAN to retrieve, on a request basis, at least one message from among said plurality of stored messages.

14. The roaming device data server of claim 9 wherein in response to receipt of the message from the roaming IoT device, the communication interface is to is to transmit a roaming notification to the roaming IoT device that the roaming IoT device is outside of the second LPWAN.

15. A gateway for a first low power wide area network (LPWAN), the gateway comprising:
a processor;
a receiver to wirelessly receive a message from an IoT device, wherein the message includes a group level identifier that corresponds to a plurality of IoT devices; and
a non-transitory machine readable storage medium including machine readable instructions executable by the processor to:

store a white list of group level identifiers for which roaming is allowed, each group level identifier corresponding to a plurality of IoT devices;
determine, based on the group level identifier included in the message, whether or not the first LPWAN is a home network of the IoT device;
in response to a determination that the first LPWAN is the home network of the IoT device, forward the message to a network server of the first LPWAN;
in response to a determination that the first LPWAN is not the home network of the IoT device, determine whether there is insufficient information to process the message;
in response to a determination that there is insufficient information to process the message, forwarding the message to a roaming data server (RDDS) for storage;
based on forwarding the message to the RDDS, notifying a second LPWAN associated with the group level identifier that the message has been received and determining how to process the message based on a response from the second LPWAN; and
in response to a determination that the group level identifier is on a roaming white list of the first LPWAN, forward the message to the home network of the IoT device.

16. The gateway of claim 15 wherein the instructions include instructions to: in response to the determination that the group level identifier included in the message is on a roaming white list of the first LPWAN, forward the message to a home network of the IoT device, without sending a request to the IoT device to join the first LPWAN.

17. The gateway of claim 15 wherein the group level identifier includes at least one of a network ID of the home network of the IoT device and an application ID of an application.

18. The gateway of claim 15, wherein determining whether there is insufficient information to process the message includes determining whether the group level identifier of the message is on a roaming whitelist or blacklist of the first LPWAN.

19. The gateway of claim 15 wherein the message includes data relating to a location of the IoT device, a temperature of the IoT device, weight data, data relating to a sensed environment of the IoT device, or data relating to a product monitored by a sensor of the IoT device.

20. The gateway of claim 15 wherein the second LPWAN is one of: a physical LPWAN including a gateway and a virtual LPWAN without a gateway.

\* \* \* \* \*